namic Time Warp . . . ", *The Bell Tech J.*, Sep. 81, pp. 1389–1409.

United States Patent [19]
Nose et al.

[11] Patent Number: 4,513,436
[45] Date of Patent: Apr. 23, 1985

[54] SPEECH RECOGNITION SYSTEM

[75] Inventors: Isamu Nose; Akihiko Umehara, both of Tokyo, Japan

[73] Assignee: Oki Electric Industry, Co., Ltd., Tokyo, Japan

[21] Appl. No.: 582,134

[22] Filed: Feb. 23, 1984

Related U.S. Application Data

[63] Continuation of Ser. No. 302,190, Sep. 14, 1981.

[30] Foreign Application Priority Data

Sep. 16, 1980 [JP] Japan .................................. 55-127122
Sep. 16, 1980 [JP] Japan .................................. 55-127123

[51] Int. Cl.$^3$ .............................................. G10L 1/00
[52] U.S. Cl. ..................................... 381/43; 364/513.5
[58] Field of Search .............................. 364/513, 513.5; 381/41–45

[56] References Cited

PUBLICATIONS

Myers, et al., "A Comparative Study of Several Dy-

*Primary Examiner*—E. S. Matt Kemeny
*Attorney, Agent, or Firm*—Ratner & Prestia

[57] ABSTRACT

Speech recognition with time warp is simplified by finding a certain portion of a word whose time duration is the same for all speakers. In comparing an unknown speech with a reference speech, the time duration of an unknown speech is coincided with the time length of a reference speech with the two processes. According to the invention, an element vector of a speech is classified to the first portion and the second portion. The former is a consonant and co-articulation which couples the two sounds, and the latter is a vowel. The length of the first portion is almost independent from a speaker, and the length of the second portion depends upon a speaker. Therefore, the present invention matches the first portion of an unknown speech with that of the reference speech directly without changing the time length. Next, the sample elements in the second portion of the unknown speech is linearly matched with that of a reference speech. Thus, excellent recognition is obtained using a simple calculation.

3 Claims, 6 Drawing Figures

UNKNOWN    REFERENCE

UNKNOWN    REFERENCE

SPEECH RECOGNITION SYSTEM

This application is a continuation of application Ser. No. 302,190, filed 9/14/81.

BACKGROUND OF THE INVENTION

The present invention relates to a speech recognition system which recognizes a speech by comparing the feature vector of an unknown speech with the feature vector of a reference speech which is stored in a dictionary, in particular relates to such a system which recognizes the variable speed speech.

In this specification, a feature vector means a plurality of speech feature at a sampling point, and a feature vector system means the sequence of a feature vector in a predetermined duration.

FIG. 1 shows a block diagram of a device for producing a feature vector system of unknown speech. In the figure, an analog unknown speech applied to an input terminal IN is applied to a plurality of narrow bandpass filters $BPF_1$ through $BPF_n$. The number of n is for instance 16, and the center frequency of each bandpass filters is in the range from 250 Hz to 5 kHz. Each bandpass filter detects the particular spectrum of an unknown speech. The outputs of the bandpass filters are applied to the low pass filters LPF, through the rectifiers REC. The cutoff frequency of the lowpass filters is for instance 50 Hz for removing the influence of a pitch which has the period of about 10 mS. The outputs of the lowpass filters are multiplexed by the multiplexer MPX, and the output of that multiplexer is applied to the analog-to-digital converter A/D, which converts the signal to a digital form. Next, the feature vector producing system VEC scans the output of the converter A/D in every 10 mS, and provides the feature vector having 16 elements in every 10 mS. Therefore, if the speech length is 300 mS, 480 ($=16\times30$) of vector elements are obtained. Finally, the detector DET detects the speech duration in which a speech is actually spoken, and normalizes the feature of the speech source. The output of the detector DET is a feature vector system of unknown speech, having $16\times(T/10)$ elements, where T is the speech length in mS. The feature vector system of unknown speech at the output of the output terminal OUT is compared with the feature vector systems of the reference speeches, and that unknown speech is recognized to be the same as the reference speech which provides the minimum length between the unknown speech and the reference speech.

By the way, in comparing an unknown speech with a reference speech, the speech length of the former must be the same as the latter. FIG. 2 shows a format of speech characterized by a sequence of feature vectors. Each feature vector lies along a predetermined time T on the vertical axis and is characterized by 16 channels ranging from 250 Hz to 5,000 Hz along the horizontal axis.

The curve of FIG. 2 is obtained by plotting the formant on the detector DET for 16 channels in every 10 mS.

In recognizing a speech, the speech length T must be normalized so that the speech length $T_1$ is the same as the length $T_2$ of the reference speeches.

A prior system for normalizing a speech length is a linear method, in which an element of an unknown speech corresponds to the element of a reference speech by multiplying the predetermined coefficients. In the example of FIG. 2, supposing that the elements $t_1$ and $t_2$ of the unknown speech correspond to the elements $t_1'$ and $t_2'$ of the reference speech, then, the relations $t_1=t_1'\times(T_n/T_m)$, and $t_2=t_2'\times(T_n/T_m)$ are satisfied in a linear method. However, a prior linear method has the disadvantage that the recognition performance is not good, because all the elements are expanded or shortened linearly without considering the feature of speech.

Another prior system for normalizing a speech length is a dynamic programming system, which is disclosed in, for instance, the Japanese patent publication 50—19227. In a dynamic programming system, the coefficient for multiplying to the time $t_1$ of unknown element is not constant, but is variable, and the many sampling points of unknown speech (for instance more than 30%) correspond to all the sampling points of a reference speech. For that conversion of the sampling points, the calculation process is very complicated. Further, the prior dynamic programming system has the disadvantage that the recognition performance is not good, because the conversion of the sampling points is performed not only for the speech element but also for the coupling elements between speech elements. That coupling element is called co-articulation.

SUMMARY OF THE INVENTION

It is an object, therefore, of the present invention to overcome the disadvantages and limitations of prior speech recognition systems by providing a new and improved speech recognition system.

It is an object of the present invention to provide a new and improved speech recognition system which has the excellent recognition performance.

The above and other objects are attained by a speech recognition system comprising a reference speech memory storing a feature vector system with the first portion and the second portion, and the information concerning the position of the first portion, said first portion being independent from a speaker, and said second portion being dependent upon a speaker, and means for deriving the information corresponding to those in the reference memory from an unknown speech, said system comprises the steps of (a) a first step for determining the first vector of the first portion of unknown speech by comparing the feature vectors of the first portion of a reference speech with each candidate of the first portion of an unknown speech, (b) a second step for determining the matching of the first portion of the reference speech with unknown speech by detecting the minimum length between the first portion of the reference speech and each of the candidates of unknown speech, (c) a third step for matching the second portion of unknown speech with the second portion of the reference speech by linearly designating each sample vector of unknown speech to that of a reference speech, and (d) a fourth step for recognizing an unknown speech according to the similarity obtained in said second step and said third step.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

The present inventors discovered that the variation of a speech speed depending upon a speaker can be classified into two portions. The first portion has the almost constant speed irrespective of a speaker; the second portion varies in speed as a function of the speaker. That first portion is the co-articulation which couples the two sound elements. The consonants also belong to the first portion, since the length of the consonant is almost independent from a speaker. The second portion is a vowel, the length of which depends upon a speaker. According to the present invention, the first portion of an unknown speech corresponds directly to the first portion of the reference speech, since their length is constant. The starting position of the first portion of the reference speech is fixed, and the second portion of an unknown speech is expanded or shortened linearly.

Figure 1:
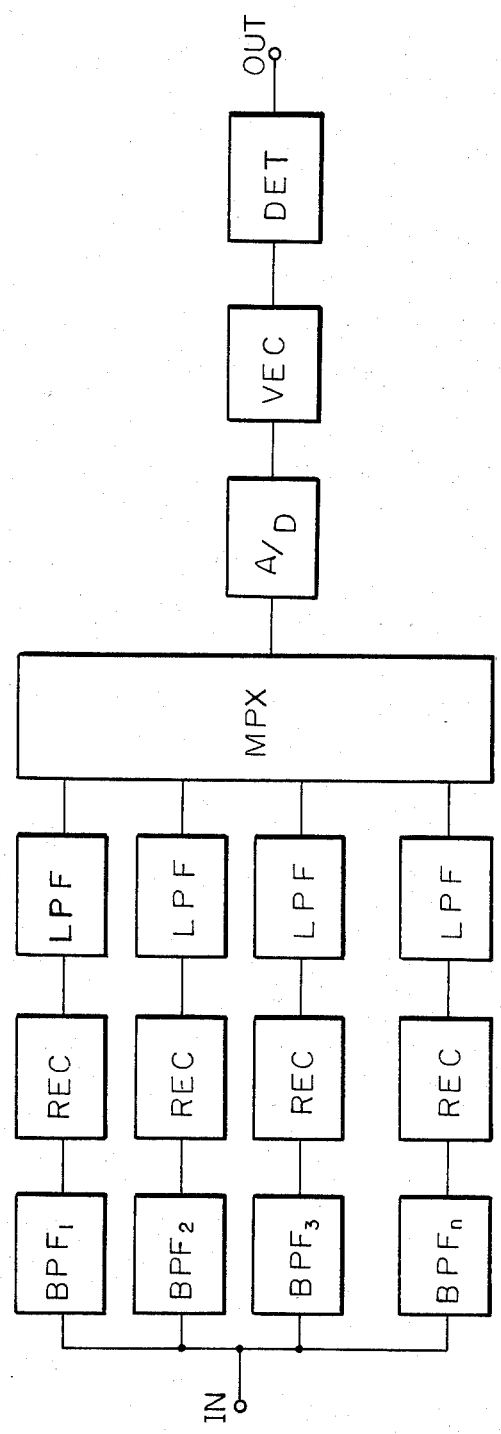
FIG. 1 shows a block diagram of the device for producing a feature vector system.
Figure 2:
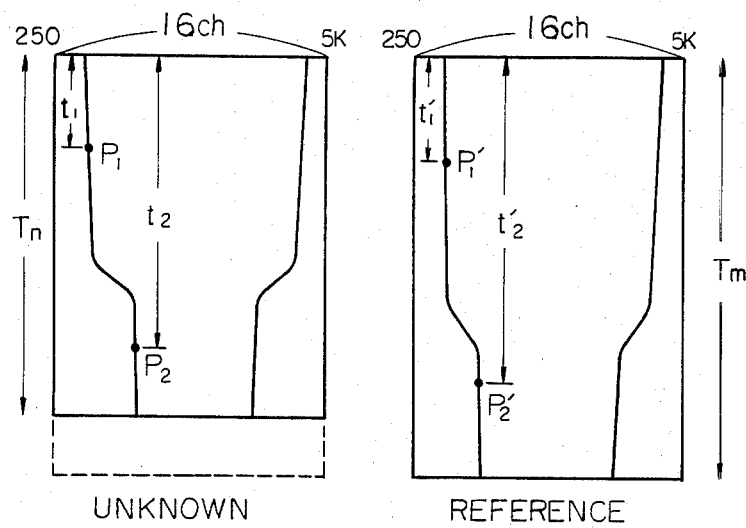
FIG. 2 shows the curves of the formants of unknown speech and a reference speech.
Figure 3:
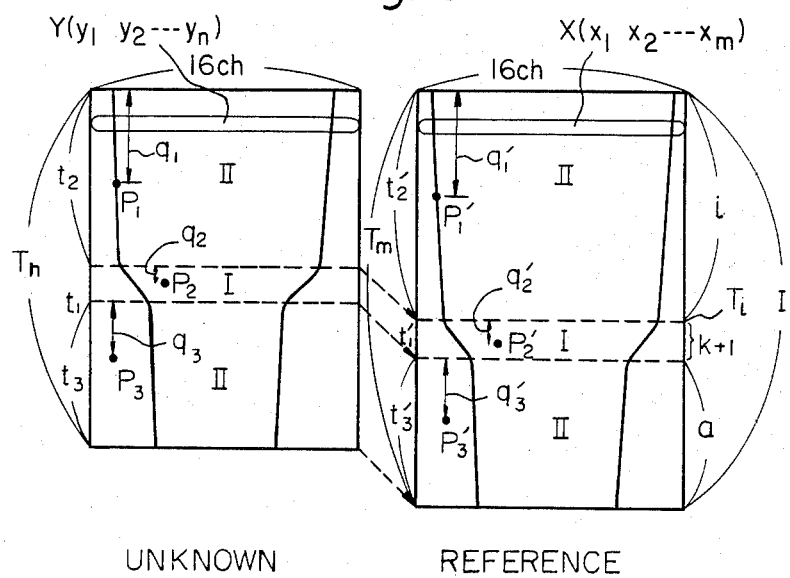
FIG. 3 shows also formants implementing the present invention.

FIG. 3 shows the principle of the present invention. It is supposed that an unknown speech has the total time length $T_1$ which has the first portion $t_1$ and the two second portions $t_2$ and $t_3$. The reference speech has the total speech length $T_2$ with the first portion and the two second portions of an unknown speech. Therefore, the element $p_1$ in the second portion corresponds to the element $p_1'$ of the reference speech, and the relation $q_1 = q_1' \times (t_2/t_2')$. On the other hand, the element $p_2$ in the first portion corresponds directly to the element $p_2$, and the relation $t_2 + q_2 = t_2' + q_2$ is satisfied. The element $p_3$ in the second portion of an unknown speech corresponds to the element $p_3'$ of the reference speech, and the relation $q_3 = q_3' \times (t_3/t_3')$ is satisfied. When the length between unknown speech and reference speech is compared, and the shortest length is detected, the element $p_1$, $p_2$, and $p_3$ are compared with the elements $p_1'$, $p_2'$ and $p_3'$. The formant of FIG. 3 is the example of the sound 'I', which pronounces 'ai'.

Figure 4:
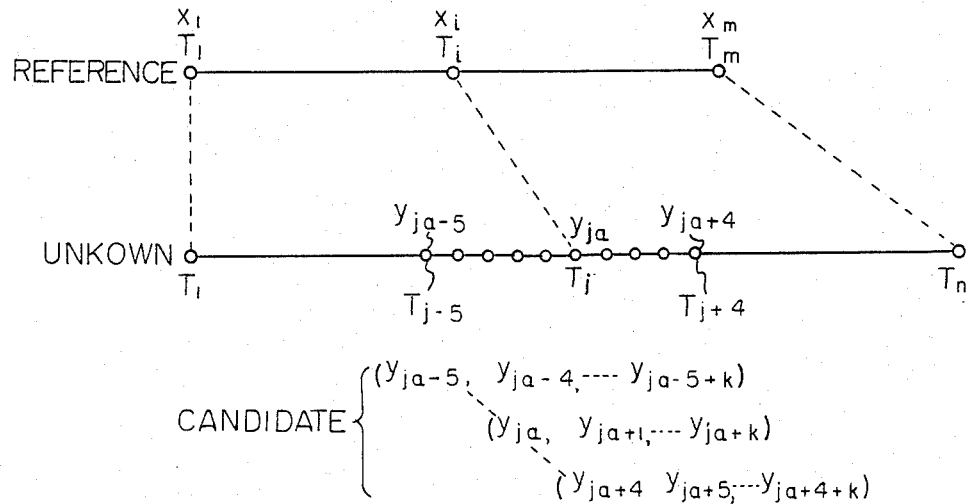
FIG. 4 shows the relations of the first element portion between an unknown speech and a reference speech.
Figure 5:
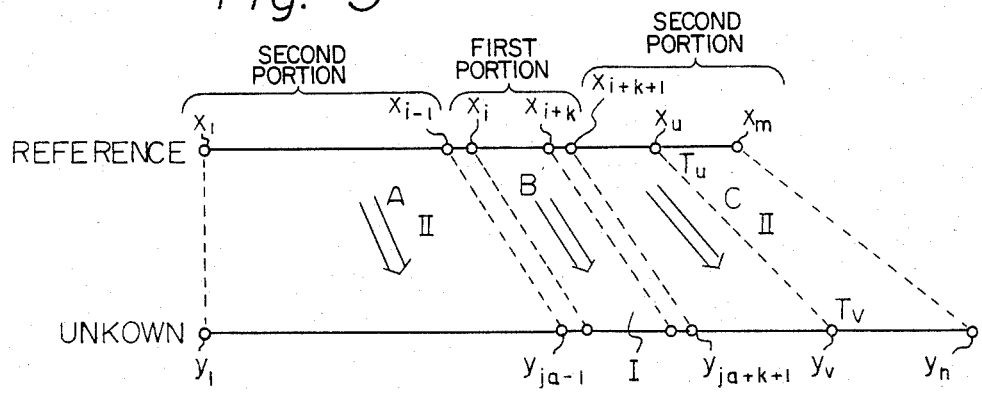
FIG. 5 shows the relations of the second element portion between an unknown speech and a reference speech.

Now, the correspondence of the elements or samples of an unknown speech to those of a reference speech is described in more detail in accordance with FIGS. 4 and 5.

It is supposed that a reference speech has the feature vector system X; $x_1, x_2, x_3, \ldots x_i, x_{i+1}, x_{i+k}, \ldots, x_m$, where each element $x_i$ has 16 informations. In the above example, the number of elements of feature vector system is m. Further, it is supposed that the first portion ($x_i \ldots x_{i+k}$) has the starting position $T_i$, and that first portion has $k+1$ number of elements. When there are a plurality of first portions in a reference speech, there are of course a plurality of feature vector systems.

Next, an unknown speech has the feature vector system Y; $y_1, y_2, y_3, \ldots, y_n$ at the time positions $T_1, T_2, \ldots T_j \ldots T_n$, respectively. The duration between $T_i$ and $T_{i+1}$ is 10 mS in the present example.

According to the present invention, the candidate of the first vector of the first portion is determined according to the formula (1).

$$\left.\begin{aligned} T_{j-5} &= (T_i \times T_n)/T_m - 5 \\ &\vdots \\ T_j &= (T_i \times T_n)/T_m \\ &\vdots \\ T_{j+4} &= (T_i \times T_n)/T_m + 5 \end{aligned}\right\} \quad (1)$$

The 10 vectors $y_{ja-5}$ through $y_{ja+4}$ corresponding to $T_{j-5}$ through $T_{j+4}$ are chosen temporarily as the first candidate vectors of the first portion, and subsequently the $k+1$ vectors following $T_{j-5}$ (i.e., $T_{j-5}$ through $T_{j-5+k}$) to each of said candidates are compared with the corresponding $k+1$ vectors of the reference speech. The comparison is performed according to the absolute length between two vectors, and/or the square method. When the length between each of the elements is $d(x_n, y_n)$, the length $D_j$ between the candidate having the first sample position $T_j$ and the first portion of the reference speech is determined according to formula (2) as shown below.

$$D_j = d(x_i, y_j) + d(x_{i+1}, y_{j+1}) + \ldots + d(x_{i+k}, y_{j+k}) \quad (2)$$

In a similar fashion $D_{j-5}$ through $D_{j+4}$ are determined as follows:

$$D_{j-5} = d(x_i, y_{ja-5}) + d(x_{i+1}, y_{ja-4}) + \ldots d(x_{i+k}, y_{ja5-k})$$

$$D_{j-4} = d(x_i, y_{ja-4}) + d(x_{i+1}, y_{ja-3}) + \ldots d(x_{i+k}, y_{ja4-k})$$

$$D_{j+4} = d(x_i, y_{ja+4}) + d(x_{i+1}, y_{ja+5}) + \ldots d(x_{i+k}, y_{ja+4-k})$$

The minimum length $D_1$ is selected from $D_{j-5}$ through $D_{j+4}$ $D_1 = $ minimum $(D_{j-5}, D_{j-4}, \ldots, D_j, \ldots, D_{j+4})$.

When the number of the vector elements in the first portion are very few, the comparison between the unknown speech and the reference speech is unstable, therefore, it is desirable that the first portion has at least 10 vector elements. When the number of the elements is less than 10 in the first portion, some vectors in the second portion are transferred to the first portion. As described before, the correct first portion of the unknown speech is selected from one of the candidates such that the minimum distance $D_1$ is obtained. The rest of the speech excluding the selected first portion of the unknown speech is the second portion.

Next, FIG. 5 shows the correspondence between the second portions of the unknown speech and the reference speech. The length of the second portion depends generally upon a speaker. Therefore, according to the present invention, the first vectors of the unknown speech and the reference speech are matched, and also, the last vectors of the unknown vector and the reference vector are matched, and then, other vectors between the first vector and the last vector are linearly interpolated.

In FIG. 5, a speech has the second portion A, a first portion B, and the second portion C, and the matching of the second portion C is described as an example. It is supposed that the first vector of the second portion C of the reference speech is $x_{i+k+1}$, and the last vector of the same is $x_m$. Also, the second portion of the unknown speech has the vectors $y_{ja+k+1}$ through $y_n$. Then, the sampling point $T_u$ of the reference speech and the sampling point $T_v$ of the unknown speech have the relations as follows:

$$T_v = (T_n - T_{ja+k+1}) \times (T_u - T_{i+k+1})/(T_m - T_{i+k+1}) + T_{ja+k+1} \quad (3)$$

where $T_u = T_{i+k+1}, T_{i+k+2}, \ldots, T_m$

Then, the length between the feature vector $x_u$ and $y_v$ of the reference speech and the unknown speech is calculated ($d(x_u, y_v)$), and the sum of the length of each of the component vectors is the similarity $D_2$. That value $D_1 + D_2$ is divided by m, which is the number of elements of the reference speech.

When a reference speech has a plurality of first portions, some feature vectors of the second portion can overlap in both the first portions. This means that the first portion has some weight, and that portion is strengthened. In this case, the number of overlap vectors is added to the total number of sample vectors of the reference speech, and the length D is divided by that sum of the addition.

The above explanation has the assumption that the total number of the feature vectors of the reference speech is stored in a memory. On the other hand, when that total number of the reference speech is not stored, the sampling point of the unknown speech is fixed and the sampling point of the reference speech corresponding to that fixed unknown speech is calculated and determined.

As described above, the present invention matches the vectors linearly, therefore, calculation process is simple, and the calculation speed is higher than that of a prior dynamic programming system. Further, by weighting some vectors in the first portion, the recognition performance is improved. Further, it is possible to determine automatically the first portion by transient detection means, instead of the use of the formula (1). Therefore, the present invention is useful in particular for a speaker independent recognition system.

Figure 6:
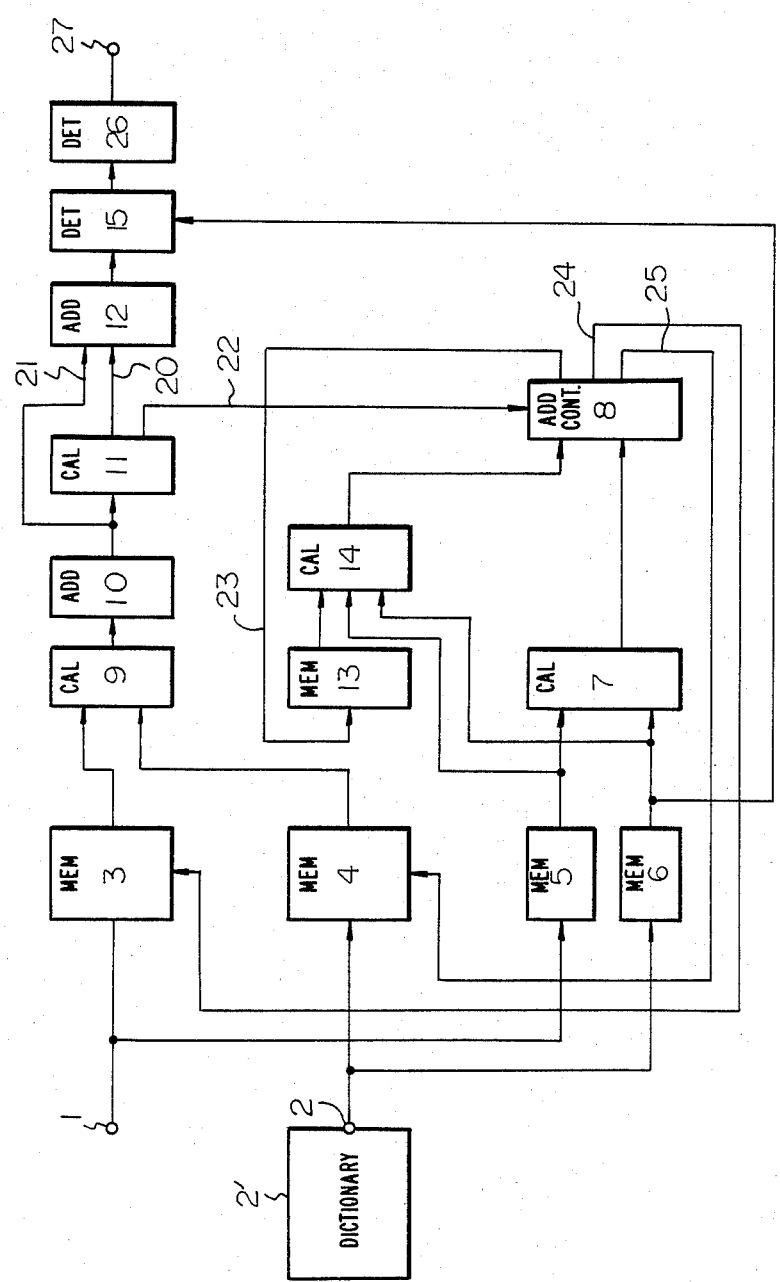
FIG. 6 is a block diagram of the speech recognition system according to the present invention.

FIG. 6 shows a block diagram of the present speech recognition system, in which the reference numeral 1 is the input terminal for accepting an unknown speech, 2 is a terminal for accepting a reference speech from a dictionary 2', 3 is a memory for storing feature vectors of unknown speech, 4 is a memory for storing feature vectors of a reference speech, 5 is a memory for storing the number (n) of the sample vectors of an unknown speech, 6 is a memory for storing the number (m) of the sample vectors of a reference speech, 7 is a calculator for calculating the matching of the first portion, 8 is an address control, 9 is a length calculator, 10 is an adder, 11 is a minimum value calculator, 12 is an adder, 13 is a memory for storing the best matching position, 14 is a calculator for calculating the matching of the second portion, 15 is a detector of the best reference speech, 20 and 21 are input signal lines for the adder 12, 22 is a signal line of the minimum value detect, 23 is an input line to the memory 13, 23 and 25 are address lines for the memories 3 and 4, 26 is the best pattern detector, and 27 is the result output line.

The feature vector systems $y_1$ through $y_n$ of an unknown speech are stored in the memory 3 through the input terminal 1, and the number (n) of that feature vectors is stored in the memory 5. Also, the feature vector system of the reference speech $x_1$ through $x_m$ are stored in the memory 4 from the dictionary 2' through the terminal 2, and the number (m) of the feature vectors is stored in the memory 6. The memory 6 also stores the information $T_1$ and $k+1$ concerning the position of the first portion. The calculator 7 performs the calculation of the formula (1) when the first portion exists, and provides the matching position. The matching position information $T_{ja}$ through $T_{jj}$ is applied to the address control 8 from the calculator 7. The address control 8 provides the address information to the memories 3 and 4, which provide the candidates of the first vector of the first portion, $y_{ja}$ through $y_{ja+k}$ and $x_i$ through $x_{i+k}$, respectively. The length calculator 9 calculates the distance between the outputs of the memories 3 and 4, and the result is applied to the adder 10. The adder 10 performs the formula (2), and the sum $D_j$ is applied to the minimum value calculator 11.

The similar calculation is performed for the candidates $T_{i-5}$ through $T_{i+5}$ of the first position of the first portion, and the length sum $D_{j-5}$ through $D_{j+4}$ is applied to the minimum value calculator 11. The minimum value calculator 11 revises the mimimum value when the new minimum value is smaller than the old one, and gives an instruction to the address control 8. The address control 8 revises the sample position information by forwarding the new candidate vector to the memory 13 through the line 23.

The minimum value calculator 11 provides the final minimum value $D_1$ to the adder 12 through the signal line 20, when all the calculations for all the candidate vectors $x_i$ through $x_{i+k}$ are finished.

When only a single first portion exists, the calculation for matching the first portions is finished with the above calculation. When there are more than two first portions, the above calculation is repeated. When there is no first portion, the above calculation is not necessary.

Next, the matching calculation for the second portion is performed. The calculator 14 calculates the formula (3) by using the sample position information stored in the memories 5 and 6, and the sample position information stored in the memory 13. In this calculation, the second portion $y_1$ through $y_{j1}$, and $y_{j+k+1}$ through $y_n$ are read out from the memory 3. The output of the adder 10 is applied directly to the adder 12, and the minimum value calculator 11 does not operate.

When all the calculations for the second portions are finished, the detector 15 receives the value (m), which is the number of the sample vectors from the memory 6, and performs the division using that value (m). The result is applied to the best pattern detector 26.

The above calculation is performed for all the reference speeches for every unknown speech, and the distance between the unknown speech and each reference speech is calculated. Therefore, the best pattern detector 26 picks up the minimum distance among the above calculation, and the result is applied to an external circuit through the output terminal 27.

From the foregoing, it will now be apparent that a new and improved speech recognition system has been found. It should be understood of course that the embodiments disclosed are merely illustrative and are not intended to limit the scope of the invention. Reference shoud be made to the appended claims, therefore, rather than the specification as indicating the scope of the invention.

What is claimed is:

1. A method of recognizing speech wherein a reference feature vector system is partitioned in memory into a reference first portion of feature vectors, which has a constant time duration independent of a speaker, and a reference second portion of feature vectors, which has a time duration dependent on a speaker, and said reference feature vector system is compared to unknown speech having an unknown first portion of feature vectors and an unknown second portion of feature vectors, comprising the steps of:

(a) locating a first portion of feature vectors in said reference feature vector system, (b) locating unwarped candidate first portions in said unknown speech by shifting said reference first portion through said unknown speech and comparing said reference first portion with said unknown speech, (c) matching said reference first portion with one of said candidate first portions in said unknown speech; and (d) matching said reference second portion with said unknown second portion by linearly designating each feature vector of said unknown second portion to a feature vector in said reference second portion.

2. The method of claim 1 wherein the comparing of step (b) includes the step of computing for each candidate first portion a summed length which is the sum of the lengths between each feature vector in the candidate first portion and each feature vector in said reference first portion.

3. The method of claim 2 wherein the matching of step (c) includes the step of selecting the candidate first portion having the minimum summed length among all of said summed lengths, thereby creating a match between the selected candidate in the unknown speech and the reference first portion.

* * * * *